(12) United States Patent
Miyazaki et al.

(10) Patent No.: US 8,313,149 B2
(45) Date of Patent: Nov. 20, 2012

(54) FOOT COVER AND VEHICLE SEAT

(75) Inventors: Masayuki Miyazaki, Tochigi (JP); Hiroshi Izawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 307 days.

(21) Appl. No.: 12/675,442

(22) PCT Filed: Aug. 27, 2008

(86) PCT No.: PCT/JP2008/065268
§ 371 (c)(1),
(2), (4) Date: Feb. 26, 2010

(87) PCT Pub. No.: WO2009/028535
PCT Pub. Date: Mar. 5, 2009

(65) Prior Publication Data
US 2010/0213752 A1    Aug. 26, 2010

(30) Foreign Application Priority Data

Aug. 27, 2007    (JP) ................................. 2007-219590

(51) Int. Cl.
*B60N 2/44* (2006.01)
(52) U.S. Cl. .................................................. 297/463.1
(58) Field of Classification Search ............... 297/463.1, 297/463.2, 344.1
See application file for complete search history.

(56) References Cited

U.S. PATENT DOCUMENTS

| 5,242,143 | A | * | 9/1993 | Nagashima et al. | ....... 248/345.1 |
| 5,275,369 | A | * | 1/1994 | Kamata et al. | ............ 248/345.1 |
| 5,285,993 | A | * | 2/1994 | Kamata et al. | ................ 248/429 |
| 5,454,541 | A | * | 10/1995 | Ito | ................................. 248/430 |
| 5,482,243 | A | * | 1/1996 | Minder | ..................... 248/345.1 |

FOREIGN PATENT DOCUMENTS

| JP | 1 161124 | 11/1989 |
| JP | 1 161125 | 11/1989 |
| JP | 2 126935 | 10/1990 |
| JP | 6 13932 | 2/1994 |
| JP | 11 20851 | 1/1999 |
| JP | 2000 108729 | 4/2000 |

* cited by examiner

*Primary Examiner* — Milton Nelson, Jr.
(74) *Attorney, Agent, or Firm* — Schiff Hardin LLP

(57) ABSTRACT

A foot cover includes a pair of laterally spaced surface sections, first engagement portions on the insides of the lateral surface sections and configured to be engaged with a front side of a leg bracket, a second engagement portion at a rear side of the foot cover and configured to engage a rear side of the leg bracket, and an urging rib that urges the foot cover toward the rear side thereof. The first engagement portions have a fore-and-aft restricting surface that restricts the foot cover from being displaced rearwardly when mounted and a first inclination surface that abuts an associated front end portion of the leg bracket to restrict deformation of the associated lateral surface section into a separating direction of the lateral surface sections.

15 Claims, 12 Drawing Sheets

(a)

(b)

(a)

(b)

FOOT COVER AND VEHICLE SEAT

TECHNICAL FIELD

The present invention relates to a foot cover, and particularly to a foot cover for covering a leg bracket for fixing a lower rail of slide rails in a vehicle seat and a vehicle seat.

BACKGROUND ART

Conventionally, vehicle seats are each provided with a seat slide apparatus which is mounted at a lower portion of the vehicle seat and which is capable of adjusting a position of the vehicle seat in a fore-and-aft direction. This seat slide apparatus is constituted of upper rails disposed at the vehicle seat side, and lower rails disposed at a vehicular body floor side. These lower rails are fixed to the vehicular body floor side through leg brackets, respectively. Further, the leg brackets are covered with foot covers so as to avoid direct and outward exposure of the leg brackets, respectively, thereby improving an external appearance quality of the vehicle seat.

Generally, foot covers are mounted on leg brackets, such that protrusions protruded from an inside of each foot cover are engaged with engagement portions of the associated leg bracket in a manner to prevent departure of the foot cover from the leg bracket (see Japanese Unexamined Utility Model Application Publication No. 1990-126935, for example).

FIG. 12 shows a situation where a conventional foot cover 100 is mounted onto a leg bracket 101, and this figure is an enlarged explanatory transverse cross-sectional view of one lateral surface section of the foot cover 100. As shown in FIG. 12, right and left lateral surface sections 111 of the foot cover 100 are forcibly spread out, and engagement protrusions 110 affixed to insides of the lateral surface sections are engagedly attached to undersides of the leg bracket, respectively, to mount the foot cover 100 to the leg bracket.

Patent Document 1: Japanese Unexamined Utility Model Application Publication No. 1990-126935.

PROBLEM TO BE SOLVED

According to the technique described in Patent Document 1, the conventional technique shown in FIG. 12, and the like, the foot cover 100 is forcibly spread outwardly upon engaging the protrusions thereof onto the engagement portions of the leg bracket 101, thereby disadvantageously requiring a space in an outward direction of the leg bracket and increasing the number of working steps, upon mounting.

Further, the leg bracket has right and left edges having flange portions extended therefrom, respectively, for ensuring a strength of the leg bracket, and in case of the conventional leg bracket 101, such flange portions have been mainly formed into downwardly bent cross-sectional shapes (downwardly oriented flanges). However, in view of the recently demanded downsizing of leg brackets 101, upwardly bent L shapes (reversely oriented flanges) have been increasingly adopted for flange portions of right and left edges of each leg bracket, respectively.

In case of adoption of a leg bracket having reversely oriented flanges, the flange portions of the leg bracket are just disposed to cover lateral sides of an associated lower rail, respectively. This requires a foot cover to be forcibly spread outwardly upon mounting thereof, to an extent wider than that in case of adopting a leg bracket having downward flanges, thereby making it difficult to ensure a working space for a mounting operation of the foot cover in a manner to forcibly spread it outwardly to the larger extent.

In view of the above problems, it is therefore desired to provide a foot cover which allows for obtainment of a stably mounted state thereof, an excellent mounting workability even in case of a smaller space laterally to the mount portions of the foot cover, and a preferable external appearance quality thereof. It is also desired to provide a vehicle seat exhibiting an improved external appearance quality and an improved assembling workability.

MEANS FOR SOLVING PROBLEM

The above problems are solved by a foot cover configured to be mounted on a support body connected to a vehicular body to thereby cover the support body, wherein the support body is configured to support a lower rail disposed to be relatively slidable in a fore-and-aft direction with respect to an upper rail provided on a seat cushion, the foot cover comprising:

a pair of lateral surface sections separated from each other in a right-and-left direction with a gap therebetween, the pair of lateral surface sections cooperatively constituting one end of the foot cover;

first engagement portions provided at opposite insides of the lateral surface sections and configured to be engaged with one end of the support body; and, a second engagement portion provided at a position of the foot cover opposite to the lateral surface sections, and configured to be engaged with the other end of the support body;

wherein the first engagement portions are each configured to have a displacement restricting surface and a deformation restricting surface, the displacement restricting surface being configured to restrict the foot cover from being displaced toward the second engagement portion end upon mounting of the foot cover to the support body, and the deformation restricting surface being configured to be abutted to an end of the support body to restrict deformation of the associated one of the lateral surface sections into a separating direction of the lateral surface sections upon mounting of the foot cover to the support body.

In this way, the foot cover is formed with the first engagement portions at the insides of the lateral surface sections, respectively, wherein the first engagement portions have the deformation restricting surfaces for restricting deformation of the lateral surface sections into the spreading direction of the foot cover. Thus, the foot cover can be mounted onto the support body by rotating the foot cover around the second engagement portion as a rotate center up to an engagement position, without deformation of the lateral surface sections into the separating direction thereof (outward direction of the foot cover), thereby enabling to ensure an excellent mounting workability even in case of a smaller space laterally to the mount portions of the foot cover.

Further, it is preferable that the foot cover is configured to have an urging device that urges the foot cover toward the second engagement portion end, upon mounting of the foot cover to the support body. In this way, the urging device of the foot cover urges the foot cover toward the other end thereof upon mounting of the foot cover, so that the foot cover can be mounted onto the support body and can be held in the mounted state while being urged rearwardly by the urging device, in a manner to compensate for a dimensional tolerance of the foot cover to thereby enable to effectively restrict occurrence of looseness.

More specifically, it is preferable that the deformation restricting surface provided at each of the first engagement portions is configured to have first and second inclination surfaces. The first inclination surface is formed to be inclined from a free end toward a fixed end of the first engagement portion, in a direction opposite to the vehicular body. The second inclination surface is formed to be continued from the first inclination surface and inclined from the free end toward the fixed end of the first engagement portion, in a direction opposite to the second engagement portion. In this way, the deformation restricting surface is formed with the first inclination surface and the second inclination surface for restricting deformation of the lateral surface section in the separating direction, thereby enabling to effectively prevent deformation of the lateral surface section in the separating direction upon mounting.

More specifically, it is preferable that the first engagement portions are each configured to have an introduction rib configured to be temporarily inserted between the support body and the lower rail as the foot cover is mounted to the support body.

In this way, the introduction rib guides the first engagement portion into the engagement position, thereby enabling to more effectively prevent the lateral surface section from being deformed into the separating direction upon mounting.

Moreover, it is more preferable that the first engagement portions are each formed with at least one of a restricting rib and a displacement restricting surface. The restricting rib is configured to be inserted between an end portion of the support body and the lower rail in a mounted state of the foot cover. The displacement restricting surface is configured to restrict a displacement of the associated first engagement portion in a height direction in the mounted state of the foot cover.

In this way, the first engagement portions can each be provided with: a restricting rib for restricting the associated lateral surface section from being deformed into the separating direction in a mounted state of the foot cover; and a displacement restricting surface in a height direction for restricting the foot cover from being upwardly displaced or rotated to release the engagement; together with the displacement restricting surface for restricting the foot cover from being displaced toward the second engagement portion; thereby allowing for the first engagement portions to concentratedly possess functions to restrict displacements of the foot cover in the fore-and-aft direction, the height direction, and the widthwise direction in the mounted state of the foot cover. Thus, the foot cover can be simplified in structure, thereby contributing to improvement of durability, reduction of production cost, and the like.

Furthermore, it is preferable that the urging device comprises an urging rib configured to be elastically abutted on the support body to thereby urge the foot cover toward the second engagement portion end. In this way, the urging device is configured to have the urging rib, so that the foot cover can be mounted onto the support body and can be held in the mounted state while the first engagement portions are being rearwardly urged by the urging rib, in a manner to compensate for a dimensional tolerance of the foot cover to thereby enable to effectively restrict looseness.

Further, it is preferable that the foot cover is so configured that a length of the foot cover in the longitudinal direction between the first engagement portions and the second engagement portion is configured to be slightly shorter than a length of the support body in the longitudinal direction between: engagement portions of the support body with which the first engagement portions are engaged, respectively; and an engagement portion of the support body with which the second engagement portion is engaged; and that the foot cover is configured to be extendable in the longitudinal direction. In this way, the foot cover is so configured that a length of the foot cover in the longitudinal direction between the first engagement portions and the second engagement portion is configured to be slightly shorter than a length of the support body in the longitudinal direction between engagement portions of the support body with which the first engagement portions are engaged, respectively, and an engagement portion of the support body with which the second engagement portion is engaged, and the foot cover is configured to be extendable in the longitudinal direction. Thus, the foot cover can be mounted onto the support body or can be held in the mounted state while the foot cover is being urged in the longitudinal direction, in a manner to compensate for a dimensional tolerance of the foot cover to thereby enable to effectively restrict occurrence of looseness.

The above problems are further solved by a vehicle seat having a foot cover mounted on a support body connected to a vehicular body to thereby cover the support body, wherein the support body supports a lower rail disposed to be relatively slidable in a fore-and-aft direction with respect to an upper rail provided at a seat cushion, the foot cover comprising:

a pair of lateral surface sections separated from each other in a right-and-left direction with a gap therebetween to cooperatively constitute one end of the foot cover;

first engagement portions provided at opposite insides of the lateral surface sections and configured to be engaged with one end of the support body; and, a second engagement portion provided at a position of the foot cover opposite to the lateral surface sections and configured to be engaged with the other end of the support body;

wherein the first engagement portions are each configured to have a displacement restricting surface and a deformation restricting surface, the displacement restricting surface being configured to restrict the foot cover from being displaced toward the second engagement portion upon mounting of the foot cover to the support body, and the deformation restricting surface being configured to be abutted to an end of the support body to restrict deformation of the associated one of the lateral surface sections into a separating direction of the lateral surface sections upon mounting of the foot cover to the support body.

The above problems are still further solved by a foot cover for mounting on and covering a seat support mounted to a body of a vehicle, the seat support arranged to support a lower rail of a slidable rail system that facilitates movement of a seat of the vehicle in a fore-and-aft direction with respect to the body of the vehicle, the foot cover comprising:

a pair of lateral sections at a fore location of the foot cover, the lateral sections being separated from each other in a right-and-left direction with a gap therebetween;

first engagement portions provided at opposite insides of the lateral sections, the first engagement portions being configured to engage a fore portion of the seat support; and, a second engagement portion at an aft location of the foot cover, the second engagement portion being configured to engage an aft portion of the seat support so as to restrict the foot cover from being displaced toward the fore portion of the seat support upon mounting of the foot cover to the seat support;

wherein each of the first engagement portions comprises a displacement restricting surface and a deformation restricting surface, the displacement restricting surfaces being configured to restrict the foot cover from being displaced toward the aft portion of the seat support upon mounting of the foot cover to the seat support, and the deformation restricting surfaces being configured to restrict deformation of the lateral sections in a separating direction upon mounting of the foot cover to the seat support.

EFFECT OF THE FOOT COVER DESCRIBED HEREIN

According to the foot cover described herein, it is possible to restrict deformation of the lateral surface sections into the separating direction thereof, by abutting the front end portions of the leg bracket to the deformation restricting surfaces formed at the foot cover side upon mounting. Namely, the first engagement portions are rotated up to the engagement position around the second engagement portion as the rotate center while the first engagement portions are being rearwardly urged by the urging device, so that the foot cover can be mounted onto the support body without deformation of the lateral surface sections in the separating direction, thereby enabling to provide the foot cover capable of ensuring an excellent mounting workability even in case of a smaller space laterally to the mount portions of the foot cover. Further, even in case of the reversely oriented flanges, it is possible to mount the foot cover in the same process and with the same difficulty as those in case of the downwardly oriented flanges. Moreover, it becomes possible to provide a vehicle seat exhibiting an improved external appearance quality and an improved assembling workability.

Figure 1:
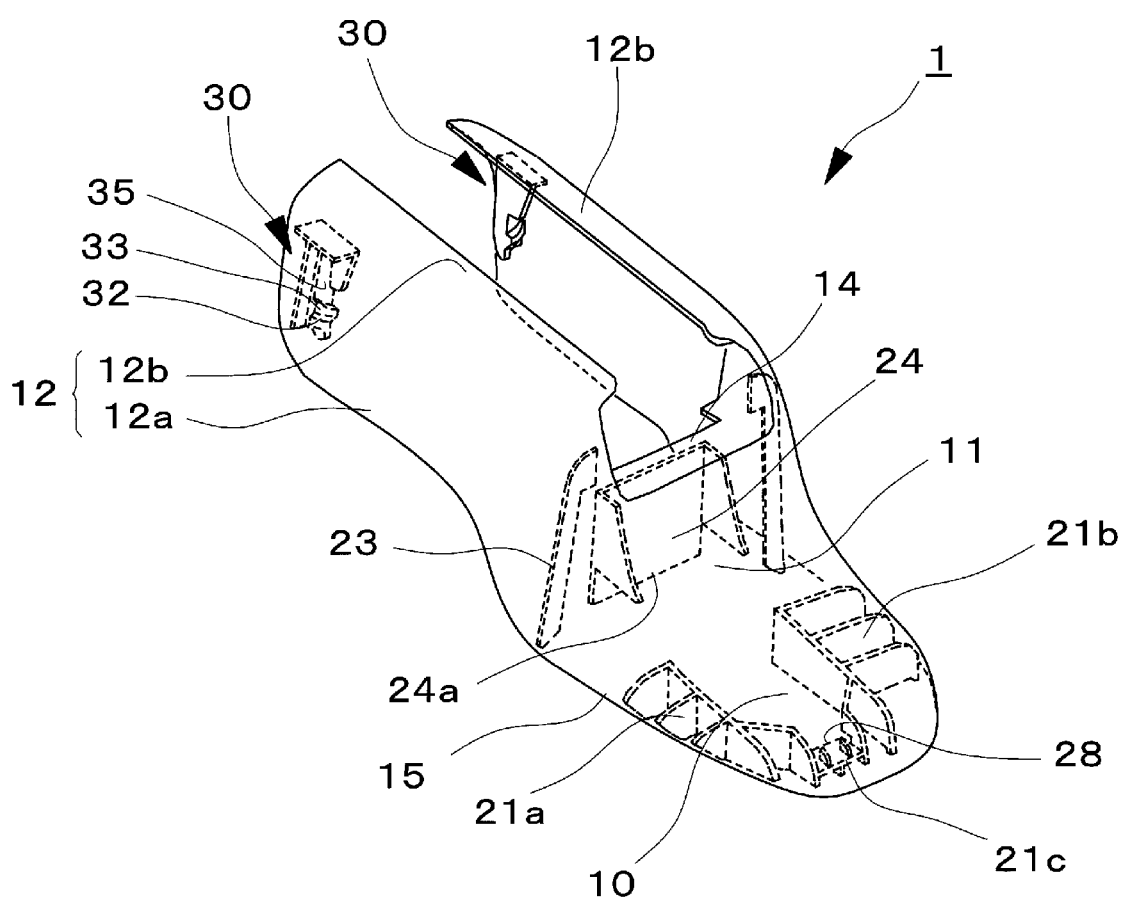
FIG. 1 is a schematic perspective view of a foot cover according to a first embodiment of the present invention.

EXPLANATIONS OF LETTERS OR NUMERALS 1, 50, 100 foot cover
2, 101 leg bracket
3, 102 lower rail
4 upper rail
5 vehicle seat
10 rear flat section
11 slope section
12, 111 lateral surface section
12a, 15 lateral side portion
12b upper portion of lateral surface section
14 front flat section
21a, 21b, 21c, 23 reinforcing rib
24 urging rib
24a tongue portion
28 second engagement portion
30 first engagement portion
31 introduction rib
32 first inclination surface
33 second inclination surface
34 widthwise restricting rib
35 fore-and-aft restricting surface
36 heightwise restricting surface
37 convex portion
40 lower flat portion
41 upper flat portion
42 slope surface
43 flange portion
44 engagement protrusion
45 front end portion of leg bracket
45a upper corner
47 holed portion
48 bolt
110 engagement protrusion

BEST MODE(S) FOR CARRYING OUT THE FOOT COVER DESCRIBED HEREIN

Embodiments of the present invention will be described hereinafter with reference to the drawings. The members, arrangements, and the like to be described hereinafter are not intended to restrict the present invention, and can be of course variously modified without departing from the spirit or scope of the present invention.

First Embodiment

Figure 2:
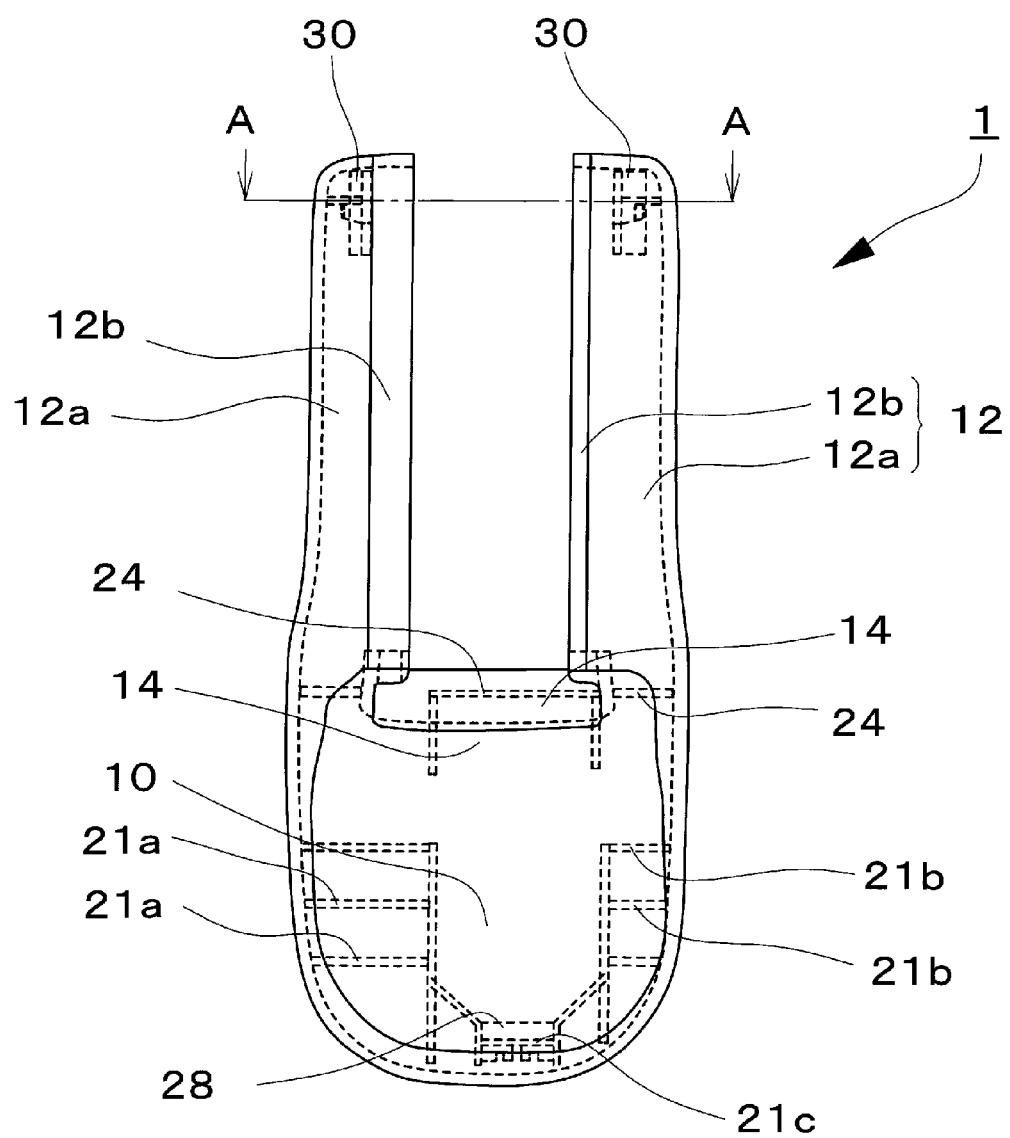
FIG. 2 is a top view of the foot cover according to the first embodiment of the present invention.
Figure 3:
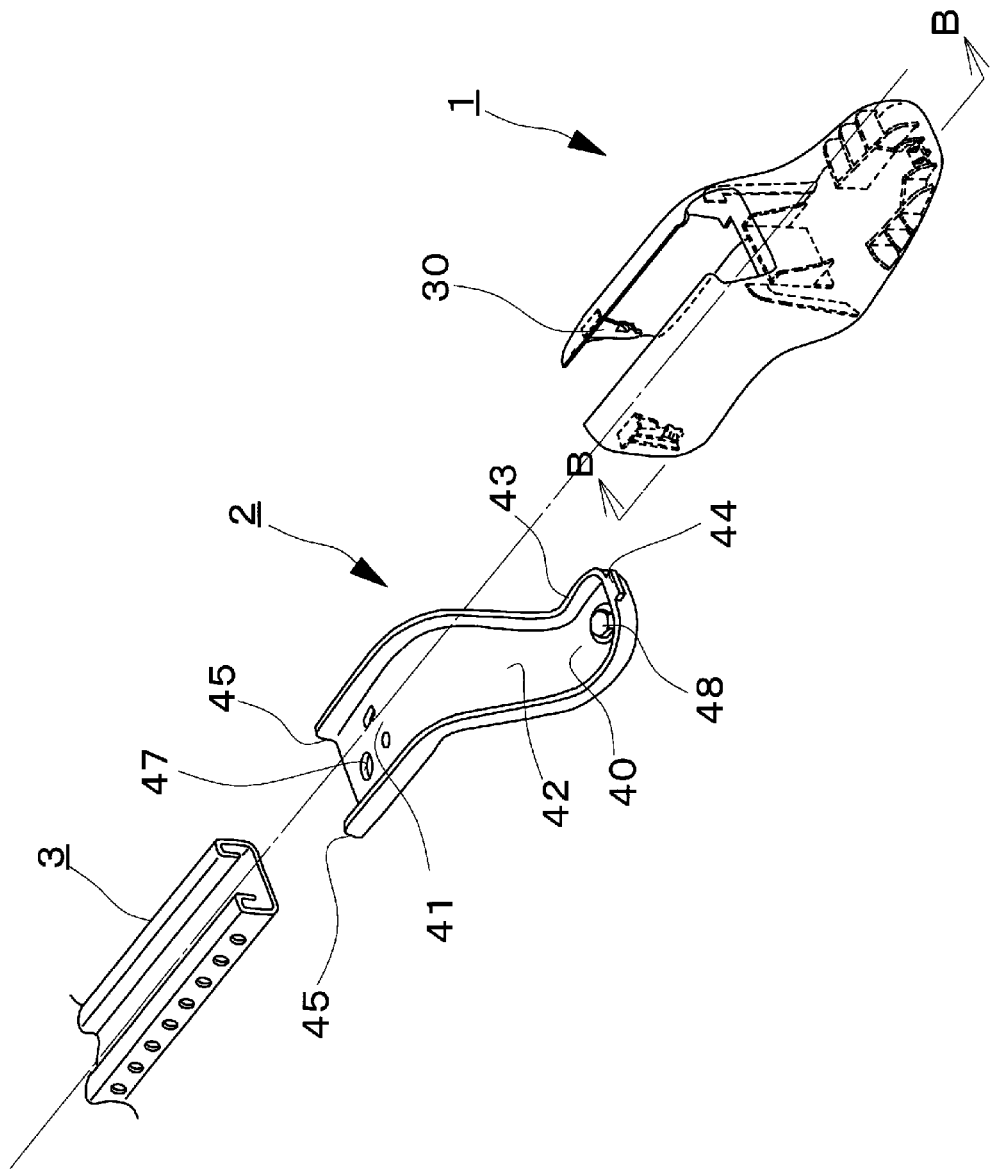
FIG. 3 is an exploded perspective view of a mounting area of the foot cover according to the first embodiment of the present invention.
Figure 4:
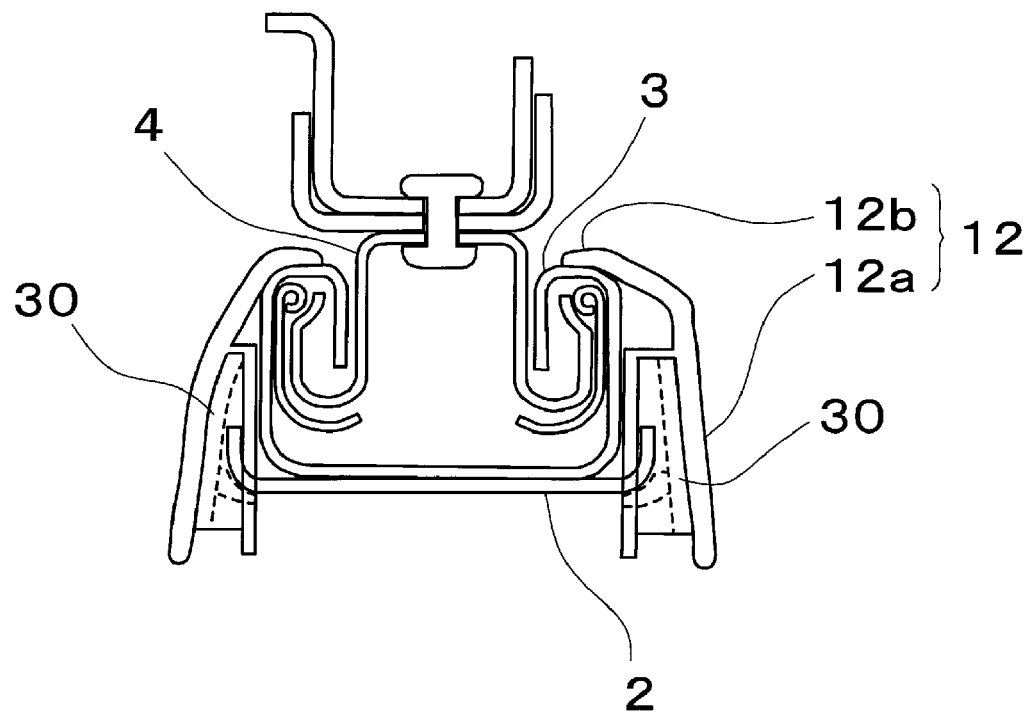
FIG. 4 is an explanatory cross-sectional view taken along a line A-A of the foot cover according to the first embodiment of the present invention.
Figure 5:
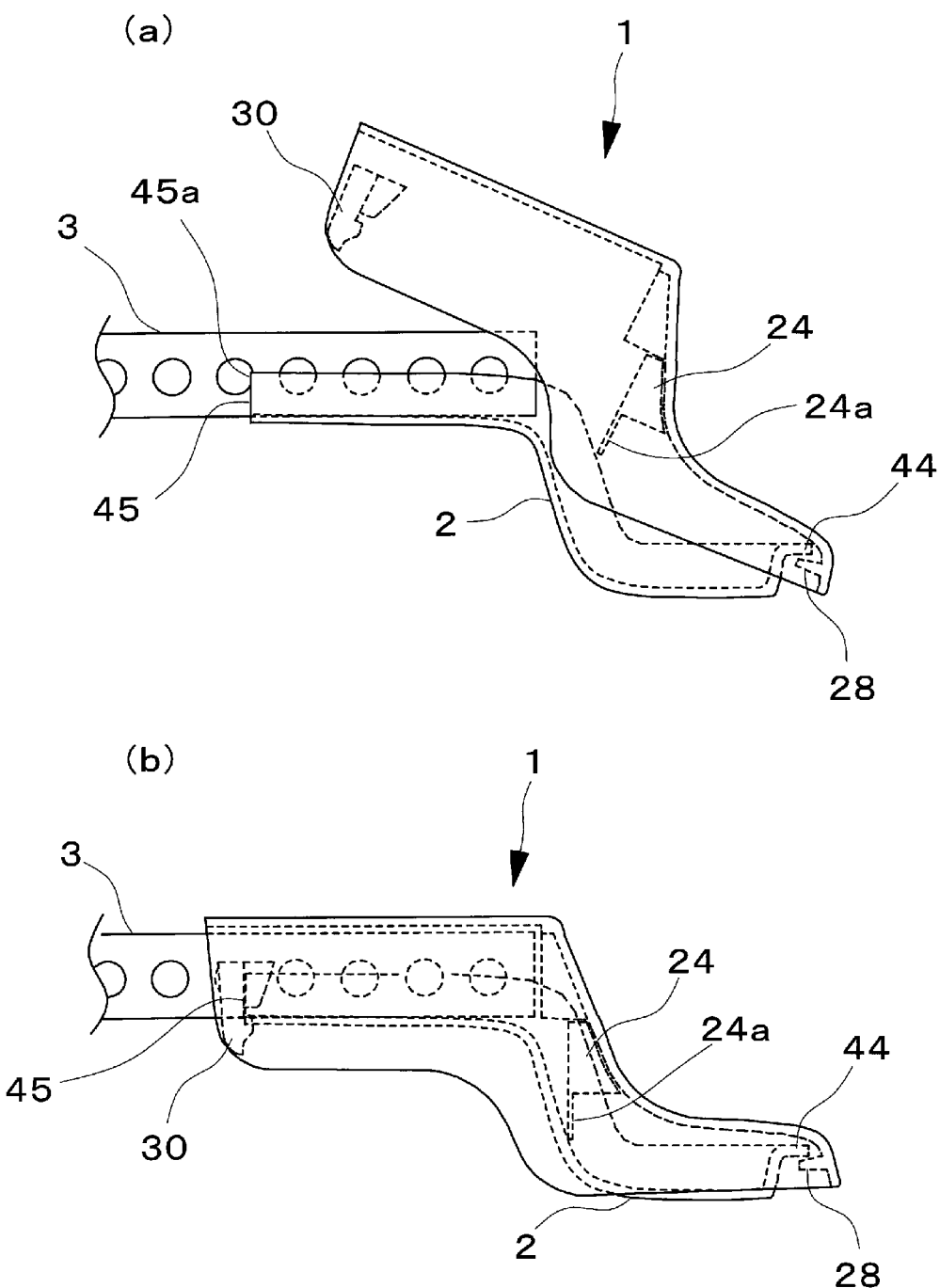
FIGS. 5(a) and 5(b) are explanatory side views showing a mounting process of the foot cover according to the first embodiment of the present invention.
Figure 6:
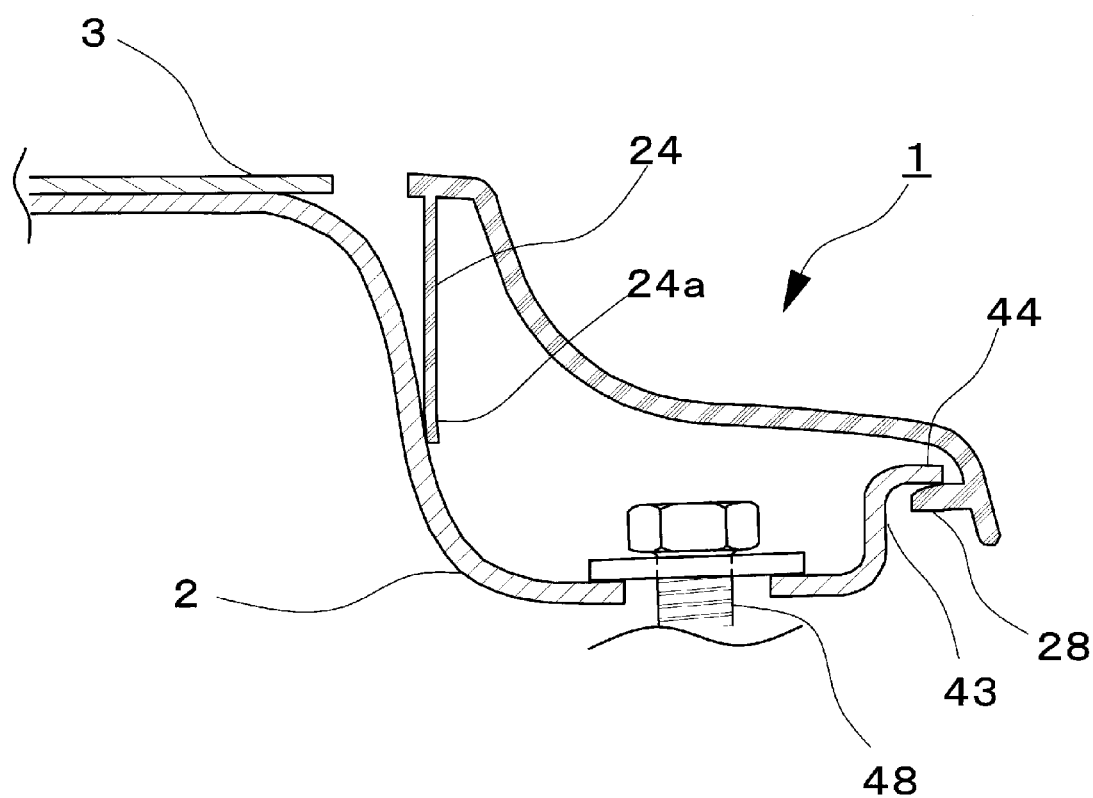
FIG. 6 is an explanatory cross-sectional view taken along a line B-B of the foot cover according to the first embodiment of the present invention.
Figure 7:
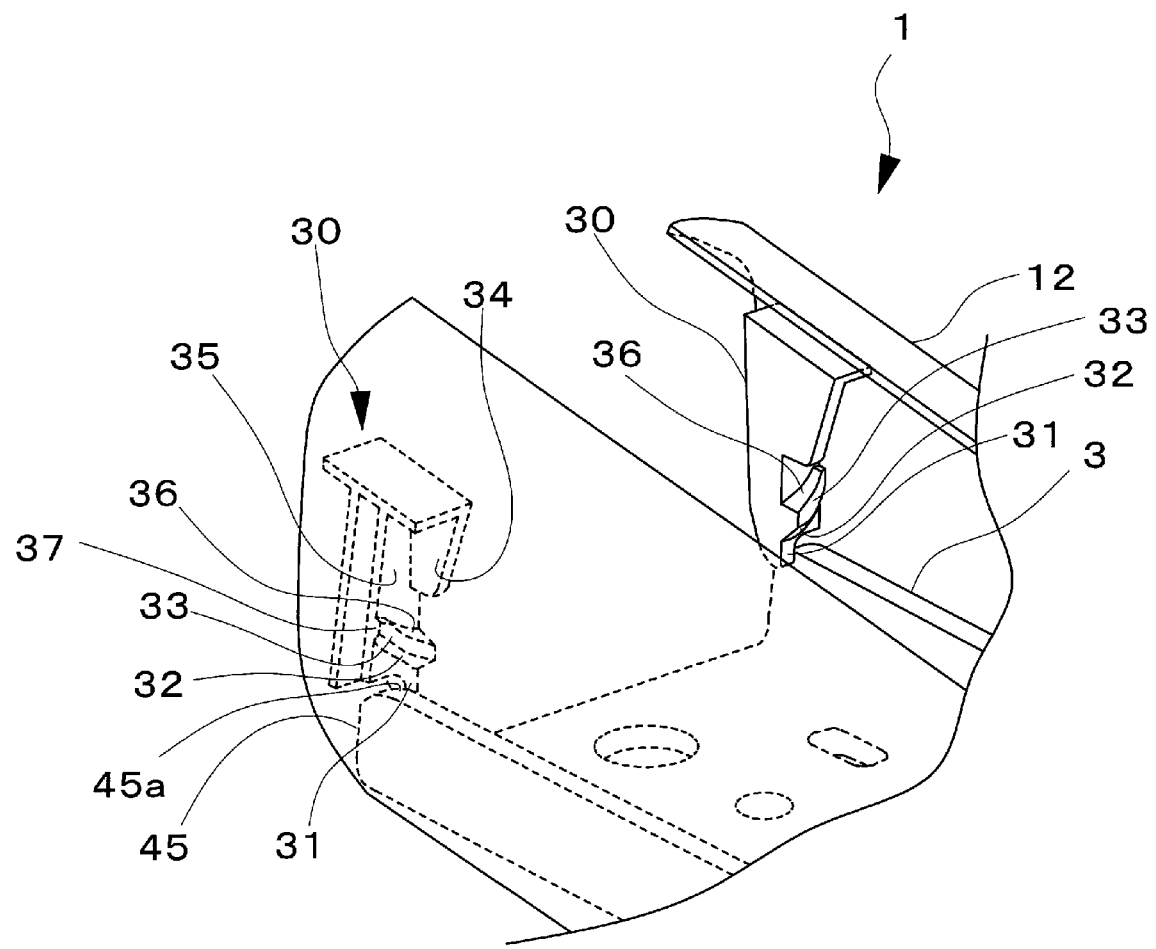
FIG. 7 is an enlarged explanatory view of a first engagement portion of the foot cover according to the first embodiment of the present invention.
Figure 8:
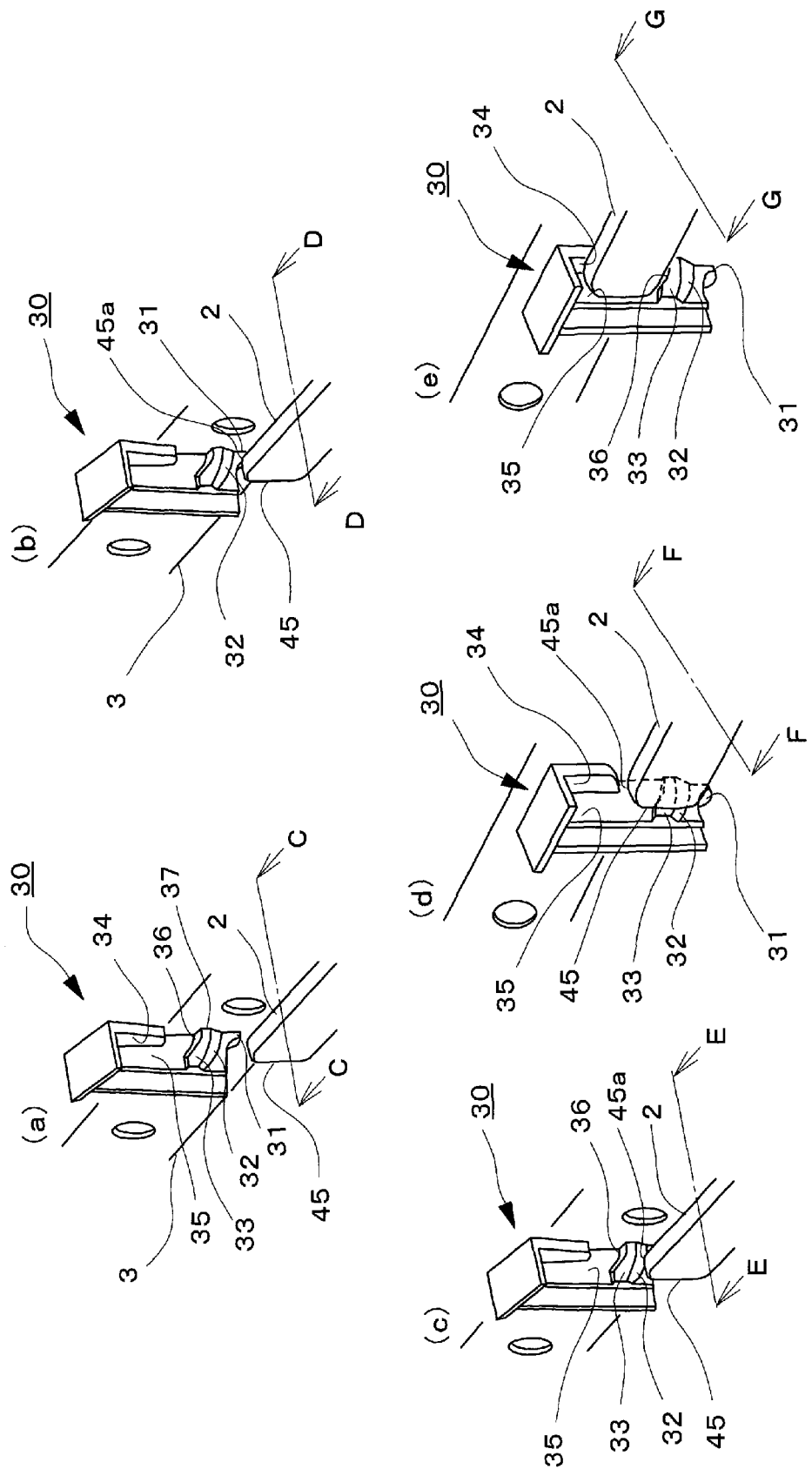
FIGS. 8(a), 8(b), 8(c), 8(d), and 8(e) are explanatory perspective views showing a process by which the first engagement portion of the foot cover according to the first embodiment of the present invention is engaged with a leg bracket.
Figure 9:
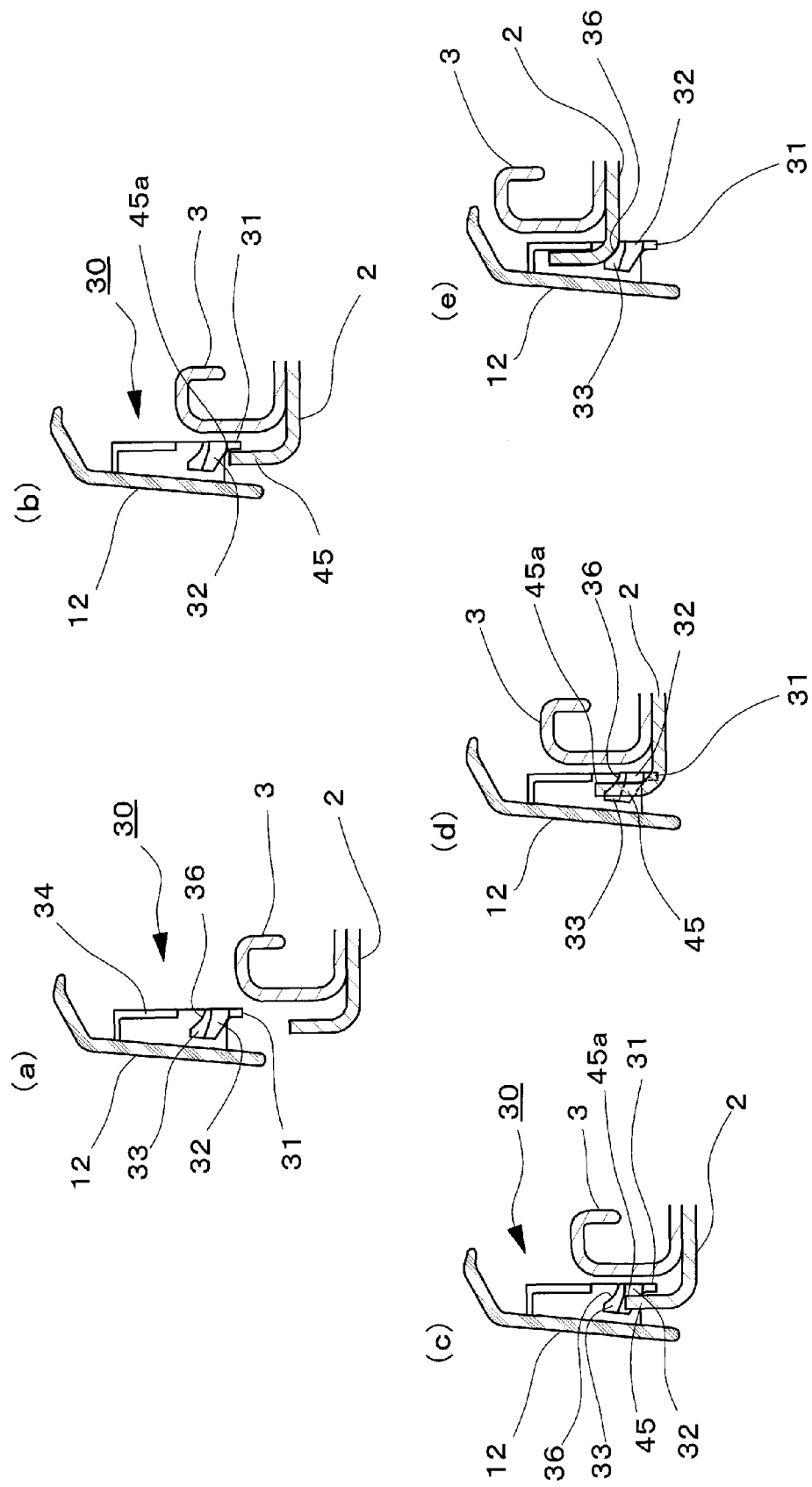
FIGS. 9(a), 9(b), 9(c), 9(d), and 9(e) are explanatory cross-sectional views showing the process by which the first engagement portion is engaged with the leg bracket.
Figure 10:
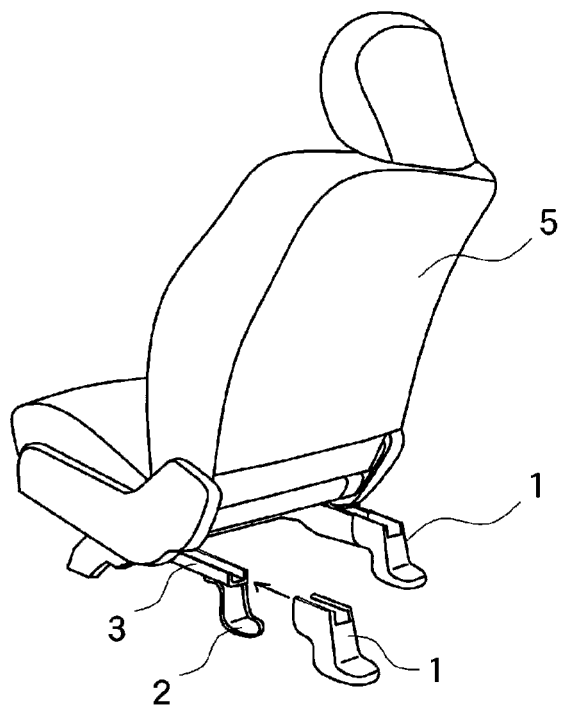
FIGS. 10(a) and 10(b) are rear perspective views of a vehicle seat before and after mounting of the foot cover, respectively.
Figure 10:
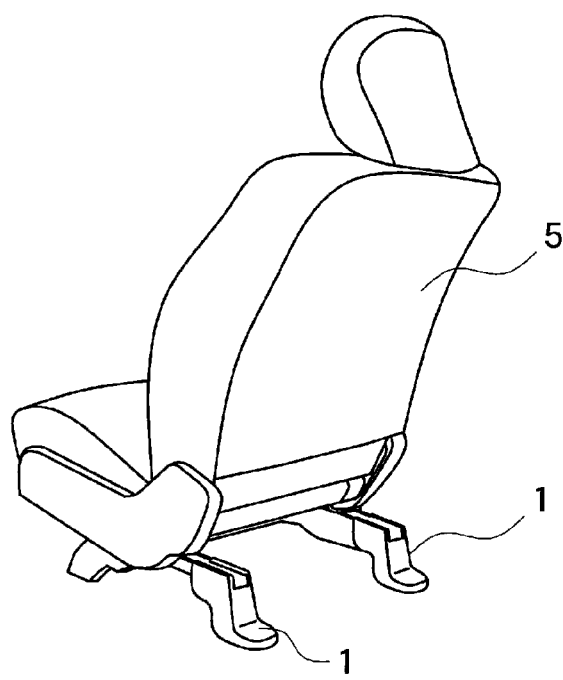

FIG. 1 through FIG. 10 show a first embodiment according to the present invention, where FIG. 1 is a schematic perspective view of a foot cover, FIG. 2 is a top view of the foot cover, FIG. 3 is an exploded perspective view of a mounting area of the foot cover, FIG. 4 is an explanatory cross-sectional view taken along a line A-A of the foot cover, FIG. 5 is an explanatory side view showing a mounting process of the foot cover, FIG. 6 is an explanatory cross-sectional view taken along a line B-B of the foot cover, FIG. 7 is an enlarged explanatory view of a first engagement portion of the foot cover, FIG. 8 is an explanatory perspective view showing a process by which the first engagement portion is engaged with a leg bracket, FIG. 9 is an explanatory cross-sectional view showing the process by which the first engagement portion is engaged with the leg bracket, and FIG. 10 is a rear perspective view of a vehicle seat before and after mounting of the foot cover.

The foot cover 1 according to this embodiment shown in FIG. 1 through FIG. 4 is mounted onto a leg bracket 2 which supports a vehicle seat from a vehicular body floor side, in a manner to cover the leg bracket. Further, as shown in FIG. 10(a) and FIG. 10(b), the foot cover 1 is mounted on the leg bracket 2 at the vehicle seat 5 side, thereby enabling to avoid exposure of an external appearance of the leg bracket 2. The leg bracket 2 is made of metal and is covered with the foot cover 1, thereby enabling to improve an external appearance quality and a design property of the vehicle seat 5. Note that the following explanation will be conducted by supposing that the directions of the vehicle in the mounted state of the foot cover 1 are adopted as directions representing the orientation of the foot cover. Namely, the forward direction of the vehicle, to which the foot cover 1 is mounted, is supposed to be a forward direction side as one direction side of the foot cover 1, and the rearward direction of the vehicle is supposed to be a rearward direction side as the other direction side of the foot cover 1, in this embodiment.

The leg bracket 2, to which the foot cover 1 is mounted, is a support body configured to support an associated lower rail 3 of a seat slide apparatus in a state floated from the vehicular body floor, and is formed into a two-steppedly bent shape from an appropriate sheet metal by sheet metal working or press working. The lower rail 3 is a member for constituting the seat slide apparatus together with an associated upper rail 4 for allowing the vehicle seat to move in a fore-and-aft direction, and the lower rail 3 has a rear end side having the leg bracket 2 mounted thereto, so that the lower rail 3 is fixed to the vehicular body floor.

The leg bracket 2 is constituted of a lower flat portion 40 established into a rear lower portion, an upper flat portion 41 established into a front upper portion, and a slope surface 42 for connecting the upper and lower flat portions 40, 41 to each other, and the leg bracket 2 is formed with a flange portion 43 upwardly bent into an L shape along an edge of the leg bracket 2 except for a front end portion of the upper flat portion 41. Here, although the flange portion 43 is configured to have an L shape cross-section in this embodiment, it is possible to adopt a semicircular shape, inverted U shape, or the like.

The lower flat portion 40 of the leg bracket 2 is formed with a holed portion for fixing the leg bracket to the vehicular body floor by a fixture member such as a screw, bolt 48, or the like, and the upper flat portion 41 is formed with a holed portion 47 for fixing the leg bracket to the lower rail 3 by a fixture member such as a rivet, or bolt/nut. Further, the flange portion 43 at the lower flat portion 40 has a rear end portion formed with an engagement protrusion 44 protruded rearwardly. Note that although the engagement protrusion 44, to which a second engagement portion of the foot cover 1 is engaged, has a shape of protrusion in this embodiment, it may be a holed portion formed at a side surface of the flange portion. In such a case, the second engagement portion 28 of the foot cover 1 is fitted into the holed portion for engagement.

The foot cover 1 is a member molded from an appropriate resin material such as polypropylene, and formed into a two-steppedly bent shape so as to correspond to the shape of the connecting section of the leg bracket 2 to the lower rail 3. The foot cover 1 includes a rear flat section 10 positioned at a rear lower area, a front flat section 14 positioned at a front upper area, and a slope section 11 for connecting them with each other, and the rear flat section 10 and slope section 11 cooperatively have lateral surface areas formed into lateral side portions 15 for covering the peripheral portions, respectively. The foot cover further includes a pair of lateral surface sections 12, 12 separated from each other by a gap, as right and left surfaces forward of the front flat section 14.

The foot cover 1 has an inside formed with multiple reinforcing ribs 21a, 21b, 21c, and 23 for ensuring a strength of the foot cover 1. Namely, the rear flat section 10 at the lower location has an inside downwardly provided with the reinforcing ribs 21a, 21b, and 21c, and the lateral side portions 15 of the slope section 11 have insides provided with the reinforcing ribs 23 protruded inwardly, respectively. The second engagement portion 28 is in a substantially plate-like shape formed at the reinforcing rib 21c positioned between the reinforcing ribs 21a and 21b, and is horizontally extended forwardly of the foot cover 1. Further, the slope section 11 has a central inside formed with an urging rib 24 as an urging device.

The second engagement portion 28 is provided at a position of the foot cover 1 opposite to the lateral surface sections 12, and is formed as a protrusion protruded from an inside of the foot cover 1 at its rear end as described above, in a manner to be engaged with the engagement protrusion 44 formed at the rear end portion of the leg bracket 2. Note that although the second engagement portion 28 comprises a protrusion in a substantially plate-like shape extended from the reinforcing rib 21c in this embodiment, the second engagement portion may also be configured to be extended directly from the rear end portion of the foot cover 1.

As described above, the urging rib 24 is a plate-like member protrudedly provided at the central inside of the slope section 11 of the foot cover 1, and the urging rib 24 has an underside configured into a tongue portion 24a capable of elastically yielding in a fore-and-aft direction (longitudinal direction) of the foot cover 1, in a manner to abut to the slope surface 42 of the leg bracket 2 upon mounting of the foot cover 1 and in a mounted state thereof to thereby urge the foot cover 1 toward the rear side. Note that although the urging rib 24 is formed into the plate-like shape in this embodiment, it may be a columnar shape, prismatic shape, or the like.

The lateral surface sections 12, 12 are constituted of lateral side portions 12a, 12a developed to cover side surfaces of the lower rail 3, respectively, and upper portions 12b, 12b of the lateral surface sections, extended from upper ends of the lateral side portions 12a, 12a, to cover upper portions of the lower rail 3, respectively. Further, the lateral side portions 12a, 12a are connected to the lateral side portions 15 of the slope section 11, respectively. Moreover, the lateral side portions 12a, 12a have opposed insides provided with first engagement portions 30, 30, respectively.

As described above, the first engagement portions 30, 30 are members fixed to the opposite insides of the lateral surface sections 12, 12 (lateral side portions 12a, 12a), respectively, and those ends of the first engagement portions opposite to the ends thereof fixed to the lateral surface sections 12, 12 are formed into free ends, respectively. Upon mounting the foot cover 1, the first engagement portions are engaged with front end portions 45, 45 of the leg bracket, respectively.

Next will be explained a process by which the foot cover 1 according to the present invention is mounted to the leg bracket 2, based on FIG. 5 through FIG. 9. FIG. 5(a), and (b) show the process for mounting the foot cover 1 to the leg bracket 2, where FIG. 5(a) shows a state before mounting (before rotation) of the foot cover 1, and FIG. 5(b) shows a state after mounting (after rotation). Mounting of the foot cover 1 to the leg bracket 2 is conducted by engaging the second engagement portion 28 of the foot cover 1 with the engagement protrusion 44 provided at the rear end portion of the flange portion 43 of the leg bracket 2, and by forwardly rotating the foot cover 1, around a rotate center comprising the engagement location of the second engagement portion 28 with the engagement protrusion 44. When the foot cover 1 has been rotated up to a fitting position, the first engagement portions 30, 30 are brought to be engaged with the front end portions 45, 45 of the leg bracket, respectively, so that the foot cover 1 is mounted to the leg bracket 2.

FIG. 6 is an explanatory cross-sectional view of the foot cover 1 and the leg bracket 2 taken along a line B-B at the center thereof, in a state that the foot cover 1 is mounted. The urging rib 24 is provided at the inside of the slope section 11 of the foot cover 1, and the tongue portion 24a constituting the underside of the urging rib 24 is abutted to the slope surface 42 of the leg bracket 2 and elastically deformed, thereby normally urging the foot cover 1 rearwardly. The elastic deformation of the urging rib 24 rearwardly urges the first engagement portions 30, 30 of the foot cover 1 in the fitting position, so that the foot cover 1 is strongly fixed to the leg bracket 2. Note that the foot cover 1 is slightly moved into the urged direction, by the urging. Nonetheless, the engagement area of the second engagement portion 28 of the foot cover 1 with the engagement protrusion 44 of the leg bracket 2 has such an engagement depth in the urged direction that is longer than the slight rearward displacement of the foot cover 1 by the urging of the urging rib 24, so that the engagement is configured to be not terminated by the movement of the foot cover 1 by the urging.

Here, the process will be explained in detail hereinafter, by which the first engagement portions 30, 30 provided at the foot cover 1 are engaged with the front end portions 45 of the leg bracket. Firstly, the first engagement portions 30, 30 will be explained for the configuration thereof, based on the enlarged explanatory view of the first engagement portion 30 shown in FIG. 7. The first engagement portions 30, 30 are provided at the insides of the lateral side portions 12a, 12a at the front side of the foot cover 1, respectively. Each first engagement portion 30 is formed with an introduction rib 31 which is insertable between the leg bracket 2 and the lower rail 3, for positioning of mounting of the foot cover 1 to the leg bracket 2, a widthwise restricting rib 34 as a restricting rib for preventing a deformation of the lateral surface section 12 into a separating direction of the lateral surface sections after mounting of the foot cover 1, a fore-and-aft restricting surface 35 as a displacement restricting surface for preventing a displacement of the foot cover 1 to the rearward, which is the second engagement portion 28 side, after mounting of the foot cover 1, and a convex portion 37 formed on the fore-and-aft restricting surface 35.

Each introduction rib 31 has a function to be inserted into between the leg bracket 2 and lower rail 3 to keep the lateral surface section 12 from spreading into the separating direction, to thereby guide the foot cover 1 into an appropriate positional relationship with the leg bracket 2. Each widthwise restricting rib 34 has a function to be inserted between the front end portion 45 of the leg bracket and the lower rail 3, to thereby prevent the lateral surface section 12 from being deformed into a separating direction of the lateral surface sections after mounting of the foot cover 1. Each fore-and-aft restricting surface 35 is a surface to be arranged at the associated front end portion 45 of the leg bracket, and has a function to prevent such a situation that the foot cover 1 is rearwardly moved, and the fitting of the first engagement portion 30 onto the leg bracket 2 is terminated, after the mounting of the foot cover 1. Each convex portion 37 is a long protrusion formed at the associated fore-and-aft restricting surface 35 and extended in a widthwise direction, and is configured to include a first inclination surface 32 as a deformation restricting surface constituting an underside surface of the convex portion 37, thereby preventing a deformation of the applicable lateral surface section 12 into the separating direction (outward direction) of the lateral surface sections during the rotation, a heightwise restricting surface 36 as a displacement restricting surface constituting an upside surface of the convex portion 37, thereby preventing such a situation that the first engagement portion 30 is upwardly displaced or rearwardly rotated and the engagement is terminated, after the mounting of the foot cover 1, and a second inclination surface 33 as a deformation restricting surface continued from both of and formed between the first inclination surface 32 and the heightwise restricting surface 36 of the convex portion 37.

Each first inclination surface 32 is a surface with which the associated front end portion 45 of the leg bracket contacts next to the introduction rib 31, and is temporarily abutted to an upper corner 45a of the front end portion 45 of the leg bracket upon mounting. This first inclination surface 32 is configured to be inclined upwardly from the free end side toward the fixed end side of the first engagement portion. Namely, the first inclination surface 32 is formed to be inclined relative to the rotating direction. It has a function to prevent the lateral surface section 12 of the foot cover 1 from being deformed in the separating direction when the lateral surface section 12 is abuttedly pushed onto the upper corner 45a of the associated front end portion 45 of the leg bracket. Each heightwise restricting surface 36 is formed in conformity to an R shape of a lower corner of the associated front end portion 45 of the leg bracket. This surface has a function to prevent such a situation that: the foot cover 1 is upwardly moved or reversely rotated (rearwardly rotated) and the engagement is terminated, after the foot cover 1 has been mounted onto the leg bracket 2 and is kept in the fitting position relative to it. Each second inclination surface 33 is configured to be inclined toward a direction opposite to the second engagement portion 28, from the free end side toward the fixed end side of the first engagement portion. This surface has a function to guide the lateral surface section 12 into an inward direction such that the second inclination surface 33 itself is abutted to the associated front end portion 45 of the leg bracket while the second inclination surface 33 itself is rearwardly urged, to prevent the lateral surface section 12 of the foot cover 1 from being deformed in the separating direction.

Further, the relationship of the rotational position of the foot cover 1 (first engagement portion 30) with the leg bracket 2 will be explained according to FIG. 8(a) through FIG. 8(e) and FIG. 9(a) through FIG. 9(e) each showing the foot cover in a stepwise manner correspondingly to the rotational position. FIG. 8(a) through FIG. 8(e) are explanatory perspective views showing positional relationships between the first engagement portion 30 and the front end portion 45 of the leg bracket, respectively, and the lateral surface section 12 of the foot cover 1 provided with the first engagement portion 30 is omitted in these figures. Further, FIG. 9(a) is an explanatory cross-sectional view at a position of C-C in FIG. 8(a), and FIG. 9(b), FIG. 9(c), FIG. 9(d), and FIG. 9(e) are explanatory cross-sectional views at positions of D-D in FIG. 8(b), E-E in FIG. 8(c), F-F in FIG. 8(d), and G-G in FIG. 8(e), respectively.

FIG. 8(a) and FIG. 9(a) each show a state before the first engagement portion 30 provided at the inside of the associated lateral side portion 12a of the foot cover 1 is brought to be abutted to the front end portion 45 of the leg bracket by the rotation of the foot cover 1. FIG. 8(b) and FIG. 9(b) each show a state that the introduction rib 31 provided at the lower end portion of the first engagement portion 30 has been rotated up to a position contacted with the front end portion 45 of the leg bracket, at which the introduction rib 31 is temporarily fitted between the front end portion 45 of the leg bracket and the lower rail 3, so that the first engagement portion 30 is guided to the engagement position while restricting the lateral surface section 12 of the foot cover 1 from being deformed into the separating direction.

FIG. 8(c) and FIG. 9(c) each show a state that the upper corner 45a of the front end portion 45 of the leg bracket is abutted to the first inclination surface 32, and the fitting of the introduction rib 31 has been already terminated at this stage. The first inclination surface 32 is abutted to the upper corner 45a of the front end portion 45 of the leg bracket, and is configured to be inclined relative to the rotating direction. When the first inclination surface 32 is contacted with the upper corner 45a of the front end portion 45 of the leg bracket, the lateral surface section 12 of the foot cover 1 is guided into the inward direction along the inclination of the first inclination surface 32, so that the first engagement portion 30 is guided to the engagement position while the lateral surface section 12 is restricted from being deformed into the separating direction.

FIG. 8(d) and FIG. 9(d) each show a state that the front end portion 45 of the leg bracket is abutted to the second inclination surface 33, and at this stage, the upper corner 45a of the front end portion 45 of the leg bracket is out of abutment on the first inclination surface 32. The second inclination surface 33 is configured to have an increased inner width and a decreased outer width, in a manner inclined relative to the urged direction. Similarly to the first inclination surface 32, the front end portion 45 causes the lateral surface section 12 of the foot cover 1 to be guided into the inward direction along the second inclination surface 33, so that the first engagement portion 30 is guided to the mounting position while the lateral surface section 12 is restricted from being deformed into the separating direction.

FIG. 8(e) and FIG. 9(e) each show a state that the first engagement portion 30 has been engaged at the engagement position so that the foot cover 1 has been mounted. The lateral surface section 12 is exemplarily restricted from being moved and rotated upwardly, by virtue of the heightwise restricting surface 36. Further, the lateral surface section 12 is restricted from spreading into the separating direction by virtue of the widthwise restricting rib 34 fitted between the front end portion 45 of the leg bracket and the lower rail 3, while the foot cover 1 is restricted from rearwardly moving by virtue of the fore-and-aft restricting surface 35. Moreover, the widthwise restricting rib 34, the upper portion 12b, and the like have been abutted to the front end portion 45 of the leg bracket, the lower rail 3, and the like, respectively, so that the foot cover is restricted from being further rotated forwardly.

During the mounting process and in the state after the mounting, the foot cover 1 is constantly urged rearwardly by virtue of the elastic deformation of the urging rib 24. Thus, the foot cover 1 is never moved forwardly even in the state after mounting, and at the same time, the foot cover 1 is strongly mounted on the leg bracket 2 because the foot cover 1 is engaged with the rear side of the leg bracket 2 by the second engagement portion 28.

Second Embodiment

Figure 11:
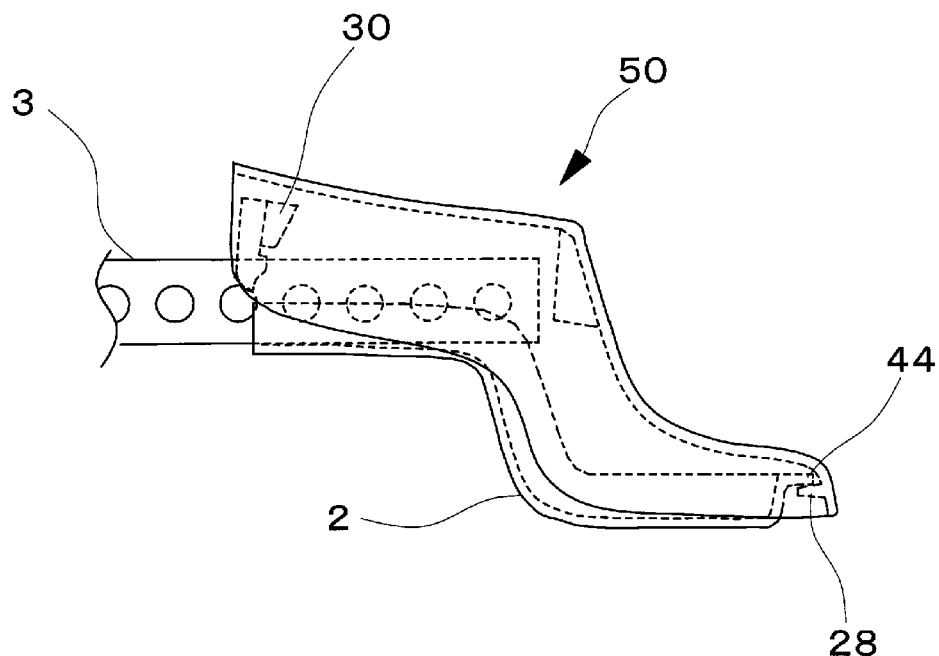
FIGS. 11(a) and 11(b) are explanatory side views of a foot cover according to a second embodiment of the present invention, showing a mounting process thereof.
Figure 11:
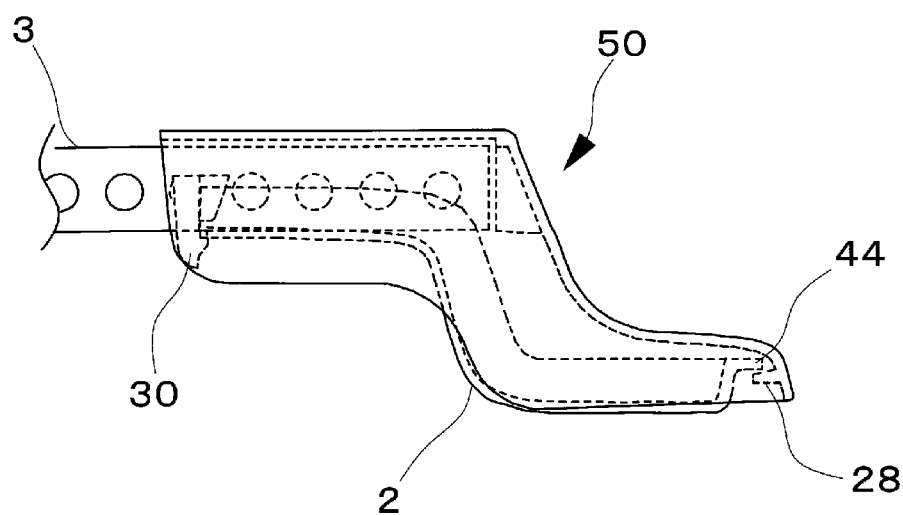
Figure 12:
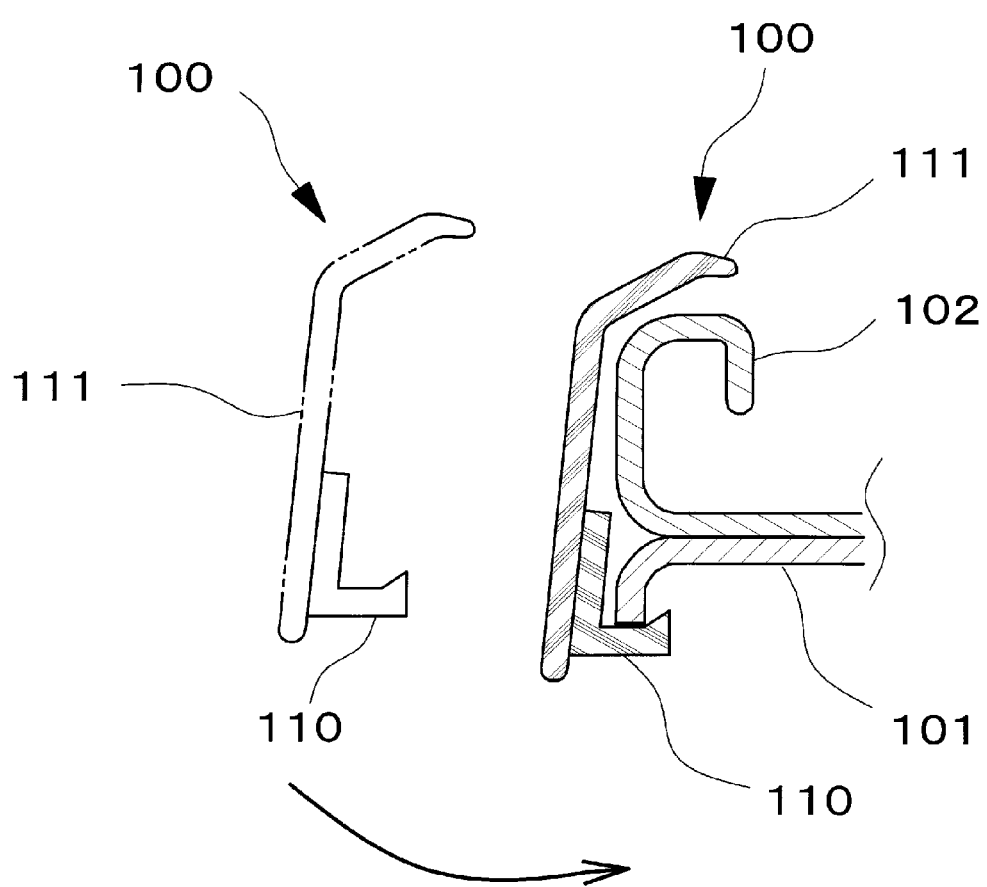
FIG. 12 is an explanatory transverse cross-sectional view of a conventional foot cover, showing a situation where the conventional foot cover is mounted onto a leg bracket.

FIG. 11 is an explanatory side view of a foot cover 50 according to a second embodiment of the present invention, showing a mounting process thereof. Although the urging rib 24 has been adopted in the first embodiment for rearward urging, the main body of the foot cover 50 according to this embodiment is configured to possess the urging function of the urging rib 24 to thereby obtain an effect equivalent to that of the first embodiment, by virtue of a configuration that the length in the longitudinal direction between a second engagement portion 28 of the foot cover 50 and first engagement portions 30 thereof is formed to be slightly shorter than the length in the longitudinal direction between those engagement portions of the leg bracket 2 side, by means of which the engagement portions of the foot cover are engaged with the leg bracket 2. This is because, the foot cover 50 is made of resin, and thus possesses a certain degree of flexibility in itself. The other configurations are the same as those of the first embodiment. Further, it is possible to constitute the foot cover 50 which is readily yielded and thus can be mounted more readily, by exemplarily changing its material into one having a higher flexibility, by forming the reinforcing ribs by only widthwise ribs, by forming the foot cover 50 to have a smaller thickness, and/or by constituting opposite lateral side portions in a downsized manner. Furthermore, it is also possible to obtain the same effect even by adopting a material having a lower ability of elastic deformation, by constituting it to be extendable in a longitudinal direction.

Although the foot covers 1, 50 of the above described first embodiment and second embodiment have been provided with the urging device that urges them, respectively, it is also possible to establish the foot covers 1, 50 into ones having no urging device, by forming them with higher precisions, respectively. Namely, the foot covers 1, 50 can be configured to have no urging device, respectively, by a manner that the length in the longitudinal direction between the second engagement portion 28 and the first engagement portions 30 of each of the foot covers 1, 50 is made to be the same as the length in the longitudinal direction between those engagement portions of the leg bracket 2 side, by means of which the engagement portions of each foot cover are engaged with the leg bracket 2. In this case, it is enough that the foot cover is formed of a material which yields to such an extent that the foot cover can be mounted onto the engagement portions of the leg bracket 2.

Each foot cover 1, 50 can be mounted to the leg bracket 2, by engaging the second engagement portion 28 of each foot cover 1, 50 with the engagement protrusion 44 of the leg bracket 2, and by forwardly rotating each foot cover 1, 50 up to the fitting position about the engagement location as the rotate center, without deformation of the lateral surface section 12 of each foot cover 1, 50 into the separating direction. This enables to reduce the number of working steps upon mounting, and to readily perform a mounting work by adopting the product of the present invention even when the mounting work has been conventionally accompanied by a higher difficulty due to failure of obtainment of a sufficient mounting space. It is further possible to obtain a vehicle seat exhibiting an excellent mounting workability.

Note that although the embodiments have been explained for the foot covers 1, 50 as specific examples each to be mounted onto the leg bracket 2 mounted on a rear portion of the lower rail 3 of a front seat of a vehicle, the present invention is not limited thereto, and it is of course possible to also exemplarily apply the same configuration to a leg bracket at a front portion of the lower rail, or to a leg bracket of a rail of a rear seat.

The invention claimed is:

1. A foot cover for mounting on and covering a seat support mounted to a body of a vehicle, the seat support arranged to support a lower rail of a slidable rail system that facilitates movement of a seat of the vehicle in a fore-and-aft direction with respect to the body of the vehicle, the foot cover comprising:
  a pair of lateral sections at a fore location of the foot cover, the lateral sections being separated from each other in a right-and-left direction with a gap therebetween;
  first engagement portions provided at opposite insides of the lateral sections, the first engagement portions being configured to engage a fore portion of the seat support; and, a second engagement portion at an aft location of the foot cover, the second engagement portion being configured to engage an aft portion of the seat support so as to restrict the foot cover from being displaced toward the fore portion of the seat support upon mounting of the foot cover to the seat support;

wherein each of the first engagement portions comprises a displacement restricting surface and a deformation restricting surface, the displacement restricting surfaces being configured to restrict the foot cover from being displaced toward the aft portion of the seat support upon mounting of the foot cover to the seat support, and the deformation restricting surfaces being configured to restrict deformation of the lateral sections in a separating direction upon mounting of the foot cover to the seat support.

2. The foot cover of claim 1, further comprising an urging device being arranged to urge the aft portion of the seat support upon mounting of the foot cover to the seat support.

3. The foot cover of claim 2, wherein the urging device comprises an urging rib being arranged to elastically abut the seat support to thereby urge the foot cover toward the aft portion of the seat support.

4. The foot cover of claim 2, wherein the foot cover has a length in the fore-and-aft direction between the first engagement portions and the second engagement portion that is slightly shorter than a length of the seat support in the fore-and-aft direction between engagement portions of the seat support engaged by the first engagement portions and an engagement portion of the seat support engaged by the second engagement portion, and wherein the foot cover is configured to be extendable in the fore-and-aft direction.

5. The foot cover of claim 1, wherein each of the deformation restricting surfaces comprises first and second inclination surfaces, the first inclination surfaces being inclined from free ends toward fixed ends of the first engagement portions in a direction opposite to the body of the vehicle, and the second inclination surfaces being continued from the first inclination surfaces and inclined from the free ends toward the fixed ends of the first engagement portions in a direction opposite to the second engagement portion.

6. The foot cover of claim 1, wherein each of the first engagement portions comprises an introduction rib configured to be temporarily inserted between the seat support and the lower rail as the foot cover is mounted to the seat support.

7. The foot cover of claim 1, wherein each of the first engagement portions comprises at least one of a restricting rib and a displacement restricting surface, the restricting ribs being configured to be inserted between end portions of the seat support and the lower rail in a mounted state of the foot cover, and the displacement restricting surfaces being configured to restrict a displacement of the first engagement portions in a height direction in the mounted state of the foot cover.

8. A vehicle seat having a foot cover mounted on a support body connected to a vehicular body to thereby cover the support body, wherein the support body is arranged to support a lower rail of a slidable rail system that facilitates movement of the vehicle seat in a fore-and-aft direction with respect to the vehicular body, the foot cover comprising:

a pair of lateral surface sections separated from each other in a right-and-left direction with a gap therebetween to cooperatively constitute one end of the foot cover;

first engagement portions provided at opposite insides of the lateral surface sections and configured to be engaged with one end of the support body; and, a second engagement portion provided at a position of the foot cover opposite to the lateral surface sections and configured to be engaged with the other end of the support body;

wherein the first engagement portions are each configured to have a displacement restricting surface and a deformation restricting surface, the displacement restricting surface being configured to restrict the foot cover from being displaced toward the second engagement portion upon mounting of the foot cover to the support body, and the deformation restricting surface being configured to be abutted to an end of the support body to restrict deformation of the associated one of the lateral surface sections into a separating direction of the lateral surface sections upon mounting of the foot cover to the support body.

9. A foot cover configured to be mounted on a support body connected to a vehicular body to thereby cover the support body, wherein the support body is configured to support a lower rail of a slidable rail system that facilitates movement of a seat in a fore-and-aft direction with respect to the vehicular body, the foot cover comprising:

a pair of lateral surface sections separated from each other in a right-and-left direction with a gap therebetween, the pair of lateral surface sections cooperatively constituting one end of the foot cover;

first engagement portions provided at opposite insides of the lateral surface sections and configured to be engaged with one end of the support body; and, a second engagement portion provided at a position of the foot cover opposite to the lateral surface sections, and configured to be engaged with the other end of the support body;

wherein the first engagement portions are each configured to have a displacement restricting surface and a deformation restricting surface, the displacement restricting surface being configured to restrict the foot cover from being displaced toward a second engagement portion end upon mounting of the foot cover to the support body, and the deformation restricting surface being configured to be abutted to an end side of the support body to restrict deformation of the associated one of the lateral surface sections into a separating direction of the lateral surface sections upon mounting of the foot cover to the support body.

10. The foot cover of claim 9, wherein the foot cover is configured to have an urging device that urges the foot cover toward the second engagement portion end upon mounting of the foot cover to the support body.

11. The foot cover of claim 10, wherein the urging device comprises an urging rib configured to be elastically abutted on the support body to thereby urge the foot cover toward the second engagement portion end.

12. The foot cover of claim 10, wherein the foot cover is configured such that a length of the foot cover in a longitudinal direction between the first engagement portions and the second engagement portion is slightly shorter than a length of the support body in a longitudinal direction between engagement portions of the support body with which the first engagement portions are engaged and an engagement portion of the support body with which the second engagement portion is engaged, and wherein the foot cover is configured to be extendable in the longitudinal direction.

13. The foot cover of claim 9, wherein the deformation restricting surface provided at each of the first engagement portions is configured to have first and second inclination surfaces, the first inclination surface being formed to be inclined from a free end toward a fixed end of the first engagement portion in a direction opposite to the vehicular body, and the second inclination surface being formed to be continued from the first inclination surface and inclined from the free end toward the fixed end of the first engagement portion in a direction opposite to the second engagement portion.

14. The foot cover of claim 9, wherein the first engagement portions are each configured to have an introduction rib configured to be temporarily inserted between the support body and the lower rail as the foot cover is mounted to the support body.

15. The foot cover of claim 9, wherein the first engagement portions are each configured to have at least one of a restricting rib and a displacement restricting surface, the restricting rib being configured to be inserted between an end portion of the support body and the lower rail in a mounted state of the foot cover, and the displacement restricting surface being configured to restrict a displacement of the associated first engagement portion in a height direction in the mounted state of the foot cover.

* * * * *